(12) United States Patent
Skatulla

(10) Patent No.: US 8,369,051 B2
(45) Date of Patent: Feb. 5, 2013

(54) CIRCUIT ARRANGEMENT AND METHOD FOR INCREASING THE SAFETY OF AN ELECTRONIC OPERATING DEVICE

(75) Inventor: Marcus Skatulla, Traunwalchen (DE)

(73) Assignee: OSRAM Gesellschaft mit beschrankter Haftung, Munich (DE)

( * ) Notice: Subject to any disclaimer, the term of this patent is extended or adjusted under 35 U.S.C. 154(b) by 465 days.

(21) Appl. No.: 12/523,508

(22) PCT Filed: Jan. 17, 2007

(86) PCT No.: PCT/EP2007/050434
§ 371 (c)(1),
(2), (4) Date: Jul. 16, 2009

(87) PCT Pub. No.: WO2008/086891
PCT Pub. Date: Jul. 24, 2008

(65) Prior Publication Data
US 2010/0033882 A1      Feb. 11, 2010

(51) Int. Cl.
*H02H 7/00* (2006.01)
(52) U.S. Cl. .......................................... 361/18
(58) Field of Classification Search ............ 361/18
See application file for complete search history.

(56) References Cited

U.S. PATENT DOCUMENTS

| | | | | |
|---|---|---|---|---|
| 4,449,177 A | * | 5/1984 | Kozai et al. | 363/126 |
| 5,523,665 A | * | 6/1996 | Deaver | 320/166 |
| 6,424,125 B1 | | 7/2002 | Graham | |
| 6,906,934 B2 | * | 6/2005 | Yang et al. | 363/49 |
| 2005/0052886 A1 | | 3/2005 | Yang et al. | |
| 2011/0068751 A1 | * | 3/2011 | Lin et al. | 320/166 |

FOREIGN PATENT DOCUMENTS

| | | |
|---|---|---|
| GB | 2 294 822 | 5/1996 |
| JP | 55 066290 | 5/1980 |
| JP | 60 013475 | 1/1985 |
| JP | 2005 269883 | 9/2005 |
| WO | WO 82/00070 | 1/1982 |

* cited by examiner

*Primary Examiner* — Ronald W Leja
(74) *Attorney, Agent, or Firm* — Cozen O'Connor

(57) ABSTRACT

A circuit arrangement for increasing the safety of an electronic operating device comprising: mains input terminals (3), a mains input filter (1) with X capacitors (XC1, XC2), which are connected in parallel with the mains input terminals, a rectifier part (2) with a full-wave rectifier (D1-D4) and a smoothing capacitor (C1), which is connected between the output terminals of the full-wave rectifier (D1-D4), and a DC-DC voltage converter (4), which is connected to the output terminals of the rectifier part. When the mains voltage is disconnected from the terminals, a load is switched on for a defined time span, the load and the time span being matched in such a way that the load consumes the residual energy which is stored in the capacitors (XC1, XC2, C1), and thus lowers the voltage across the mains input terminals (3) to a value which is unhazardous for humans within a very short period of time.

10 Claims, 1 Drawing Sheet

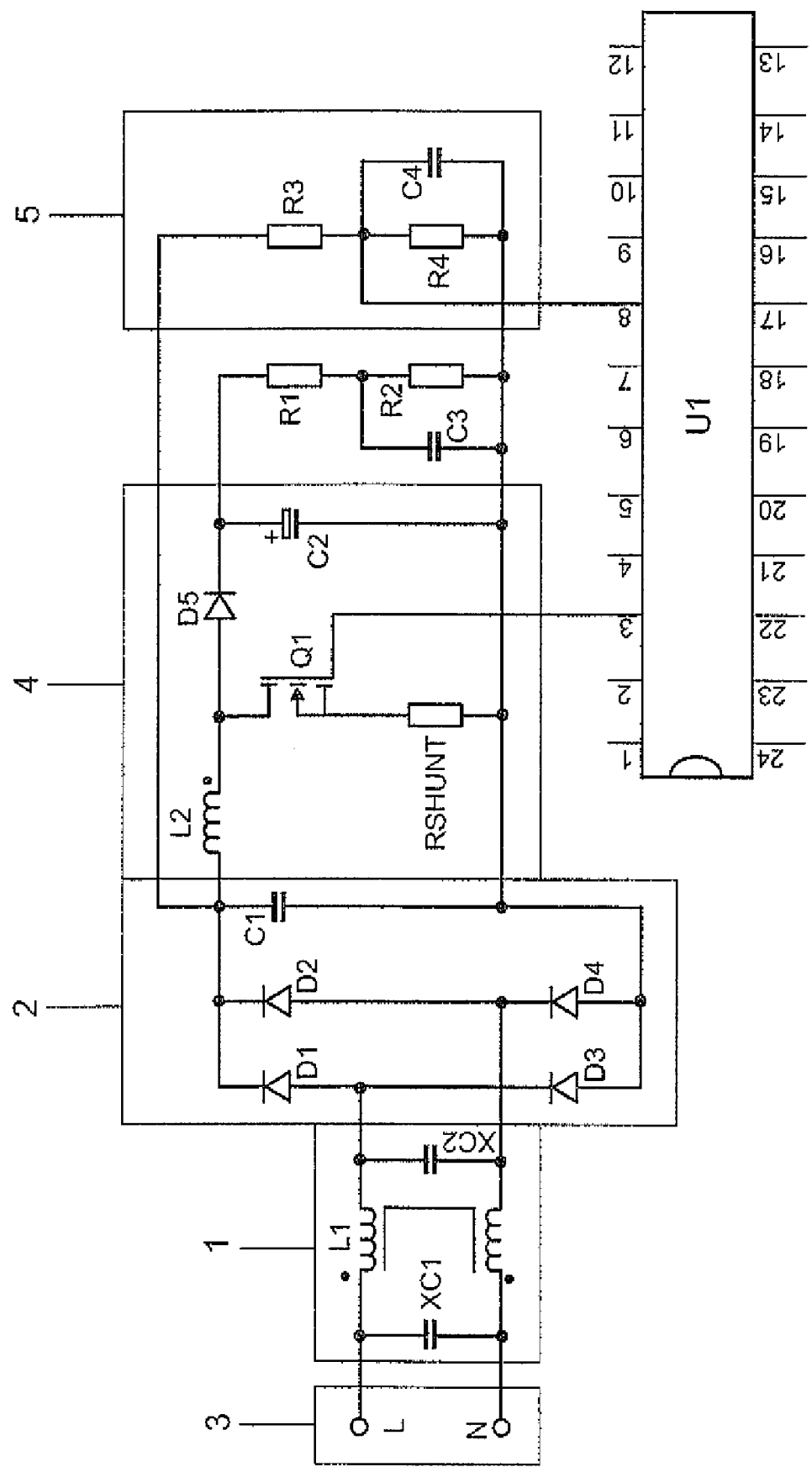

CIRCUIT ARRANGEMENT AND METHOD FOR INCREASING THE SAFETY OF AN ELECTRONIC OPERATING DEVICE

RELATED APPLICATIONS

This is a U.S. national stage of application No. PCY/EP2007/050434, filed on Jan. 17, 2007.

FIELD OF THE INVENTION

The invention relates to electronic operating devices which are operated on the mains voltage. These devices normally have a mains input filter, which comprises capacitors and inductive components. So-called X capacitors are generally also contained in this mains filter, namely capacitors which are positioned between the AC terminals.

BACKGROUND OF THE INVENTION

If an operating device is isolated from the mains voltage, these capacitors retain their voltage for a certain period of time, and there is therefore the risk of electric shock for a user, for example an electrician, when coming into contact with the mains terminals on the operating device. In some countries there is therefore a regulation which prescribes that the voltage at the mains terminals on the operating device needs to be lowered to an unhazardous voltage within a short period of time.

In order to adhere to this regulation, two different approaches are provided in the prior art. One approach consists in selecting the X capacitors to have such a low value that, with the low current consumption in the standby mode of the device, i.e. when the lamps are switched off, these capacitors are discharged in the prescribed time.

The other possibility consists in increasing the intrinsically low standby consumption of a modern electronic operating device artificially in order to discharge the capacitors in the prescribed time.

However, both embodiments have disadvantages. If the capacitors are selected so as to have too low a value, they are no longer capable of performing their actual task of filtering out mains faults and high-voltage pulses. The consequence of this is failures of the electronic operating devices owing to overvoltages in the power supply system. It is also possible under certain circumstances for faults caused by the electronic operating device to no longer be sufficiently filtered, with the result that applicable EMC (electromagnetic compatibility) regulations can no longer be adhered to.

If the capacitors are selected to have a sufficiently high value, the intrinsically very low current consumption of the operating device in the standby mode needs to be artificially increased, which has a negative effect on the total current consumption and ultimately also on the environment.

An additional problem has proven to be another backup capacitor downstream of the rectifier, which is provided in a very large number of operating devices and is intended to smooth the rectified AC voltage. In order to perform this task, the capacitor is dimensioned so as to have a very high value. Since it is connected in parallel with the X capacitors via the rectifier it must be discharged by the standby consumption at the same time as the X capacitors in order to be able to adhere to the prescribed standard.

SUMMARY OF THE INVENTION

An object of the invention is to provide a circuit arrangement and a method in which the X capacitors can be selected so as to have a sufficiently high value without the standby consumption of the operating device needing to be increased permanently.

An operating device according to an embodiment of the invention is a device which is permanently connected to the mains voltage and switches the lamp or lamps on and off via a control interface. If the lamps have been switched off, the device is in the so-called standby mode. In this state, the voltage at the mains input terminals is monitored permanently or periodically. If the disconnection of the mains voltage from the terminals is detected, a suitable load is switched on constantly or in clocked fashion for a defined time span. In this case, the power loss of the load and the length of the defined time span are matched in such a way that the energy stored in the capacitors is consumed and the voltage which is present at the mains input terminals of the electronic operating device decays rapidly. In particular the power loss of the load and the length of the defined time span are dimensioned in such a way that the voltage which is present at the mains input terminals of the electronic operating device decays so rapidly that the various applicable safety regulations are adhered to.

This circuit arrangement provides the advantages of being able to select the X capacitors to have as high a value as is necessary and at the same time of being able to keep the current consumption in the standby state of the operating device as low as possible.

BRIEF DESCRIPTION OF THE DRAWING(S)

FIG. 1 shows a circuit diagram of the circuit arrangement according to the invention.

PREFERRED EMBODIMENT OF THE INVENTION

FIG. 1 shows a circuit diagram of the circuit arrangement according to the invention, with mains input terminals (3), a mains input filter (1), a rectifier part with a filter capacitor (2), and a DC-DC voltage converter (4).

The mains input filter (1) comprises two X capacitors (XC1, XC2) and an inductor. Downstream of the mains input filter (1) there is a rectifier part (2) with a downstream smoothing capacitor (C1). The smoothed voltage is conditioned by a DC-DC voltage converter (4), which contains a switching transistor (Q1). A voltage divider (5), which taps off the voltage at the smoothing capacitor (C1), is used for detecting the mains voltage. Alternatively, the voltage can also be tapped off at one of the X capacitors (XC1, XC2), however. The output of the voltage divider is connected to an input of a microcontroller (U1) provided. Disconnection of the mains voltage can be detected by a comparison with a threshold value which needs to be undershot. Alternatively, the magnitude of the voltage drop (dU/dT) can also be detected. The detection of the disconnection of the mains voltage takes place when the voltage drop exceeds a specific value. However, both methods can also be combined with one another in order to increase the speed and safety of the identification. A third possibility consists in identifying whether, in principle, an AC voltage is present at the terminals or not. Since this can take place irrespective of the standby consumption and of the state of charge of the capacitors, this method is primarily expedient in the case of a very low standby consumption of the electronic operating device, and can increase the speed and the safety of the identification.

Since this detection primarily takes place in the standby mode, it can easily be performed by the already existing microcontroller (U1).

If a power failure has been identified, the voltage converter transistor Q1 is switched on for a very short period of time (a few ms) in order to rapidly consume the energy stored in the capacitors. It is possible for the voltage converter to be left switched on constantly. However, it can also be clocked in order not to allow the resultant current to become too high. In this way, already existing components in the circuit can be used, with the result that no additional costs arise. A voltage divider tap at the smoothing capacitor C1 is also already provided in many operating devices, with the result that no additional costs are incurred in this case either.

However, it would also be conceivable to connect a suitable load directly in parallel with the X capacitors. This would have the advantage that the smoothing capacitor, which is connected downstream of the rectifier, does not need to be discharged at the same time since it does not influence the terminal voltage.

The scope of the invention is not limited to the examples given hereinabove. The invention is embodied in each novel characteristic and each combination of characteristics, which includes every combination of features not explicitly stated in the examples.

The invention claimed is:

1. A circuit arrangement for increasing the safety of an electronic operating device, comprising: mains input terminals, a mains input filter with X capacitors, which are connected in parallel with the mains input terminals, a rectifier part with a full-wave rectifier and a smoothing capacitor, which is connected between the output terminals of the full-wave rectifier, and a DC-DC voltage converter, which is connected to the output terminals of the rectifier part, wherein when the mains voltage is disconnected from the terminals, a load is switched on for a defined time span, the load and the time span being matched in such a way that the load consumes the residual energy which is stored in the capacitors, and thus lowers the voltage across the mains input terminals to a value which is unhazardous for humans within a very short period of time, and wherein the load is a DC-DC voltage converter transistor of the DC-DC voltage converter.

2. The circuit arrangement for increasing the safety of an electronic operating device as claimed in claim 1, wherein, the DC-DC voltage converter transistor is switched on in clocked fashion.

3. The circuit arrangement for increasing the safety of an electronic operating device as claimed in claim 1, wherein, the DC-DC voltage converter transistor is switched on constantly.

4. The circuit arrangement for increasing the safety of an electronic operating device as claimed in claim 1, wherein, the mains voltage is detected directly at the mains input terminals.

5. The circuit arrangement for increasing the safety of an electronic operating device as claimed in claim 4, wherein the disconnection of the mains voltage from the terminals is identified via AC voltage detection.

6. The circuit arrangement for increasing the safety of an electronic operating device as claimed in claim 1, wherein, the mains voltage is detected at the smoothing capacitor downstream of the rectifier by means of a voltage divider.

7. The circuit arrangement for increasing the safety of an electronic operating device as claimed in claim 1, wherein, the disconnection of the mains voltage from the terminals is detected by measurement of said mains voltage and comparison with a threshold value.

8. The circuit arrangement for increasing the safety of an electronic operating device as claimed in claim 1, wherein the disconnection of the mains voltage from the terminals is identified by the drop in the mains voltage over a defined time span.

9. The circuit arrangement for increasing the safety of an electronic operating device as claimed in claim 1, wherein the disconnection of the mains voltage from the terminals is detected by measurement of said mains voltage and comparison with a threshold value, and the disconnection of the mains voltage from the terminals is identified by the drop in the mains voltage over a defined time span.

10. A method for operating a circuit arrangement for increasing the safety of an electronic operating device, comprising the steps of:

measuring mains input voltage at mains input terminals or at a smoothing capacitor;

detecting a disconnection of the mains voltage from the terminals either by a mains voltage threshold value being undershot or by measurement of the drop in the mains voltage over time and comparison with a reference value, or by a combination of the two, or by identification of the AC input voltage; and in the event of detection of a disconnection of the mains voltage from the terminals, switching-on of a load for a defined time span, the load and the time span being dimensioned in such a way that the residual energy in capacitors is consumed, and wherein the load is a DC-DC voltage converter transistor of a DC-DC voltage converter.

* * * * *